US010931737B2

(12) United States Patent
Lin et al.

(10) Patent No.: US 10,931,737 B2
(45) Date of Patent: Feb. 23, 2021

(54) PERSONAL CLOUD SYSTEM AND RELATED LOCALIZATION METHOD

(71) Applicant: Pao-Chen Lin, Hsinchu County (TW)

(72) Inventors: Pao-Chen Lin, Hsinchu County (TW); Ta-Wei Jen, Hsinchu (TW)

(73) Assignee: Pao-Chen Lin, Hsinchu County (TW)

( * ) Notice: Subject to any disclaimer, the term of this patent is extended or adjusted under 35 U.S.C. 154(b) by 0 days.

(21) Appl. No.: 16/207,205

(22) Filed: Dec. 3, 2018

(65) Prior Publication Data

US 2020/0076879 A1 Mar. 5, 2020

(30) Foreign Application Priority Data

Sep. 5, 2018 (TW) ................... 10713107.0

(51) Int. Cl.
*H04L 29/08* (2006.01)
*H04L 29/06* (2006.01)
*H04W 4/20* (2018.01)

(52) U.S. Cl.
CPC .............. *H04L 67/10* (2013.01); *H04L 67/42* (2013.01); *H04W 4/20* (2013.01)

(58) Field of Classification Search
CPC ....... H04W 4/80; H04W 12/06; H04W 4/029; H04W 12/00503; H04W 4/021; H04W 12/0013; H04W 12/08; H04W 4/023; H04W 4/38; G06F 21/6218; G06F 1/163; G06F 21/602
See application file for complete search history.

(56) References Cited

U.S. PATENT DOCUMENTS

| | | | |
|---|---|---|---|
| 8,271,898 B1* | 9/2012 | Mattos | G06F 3/0482 715/784 |
| 8,782,637 B2 | 7/2014 | Khalid | |
| 9,639,714 B1* | 5/2017 | Carlson | H04L 63/0428 |
| 2006/0079755 A1* | 4/2006 | Stazzone | A61B 5/055 600/410 |
| 2013/0151980 A1* | 6/2013 | Lee | G06F 16/954 715/738 |
| 2014/0215154 A1* | 7/2014 | Stewart | G06F 3/0659 711/114 |

(Continued)

FOREIGN PATENT DOCUMENTS

| | | |
|---|---|---|
| EP | 1 628 187 A1 | 2/2006 |
| TW | 201345235 A | 11/2013 |
| TW | M525483 U | 7/2016 |

*Primary Examiner* — Michael A Keller
*Assistant Examiner* — Thao D Duong
(74) *Attorney, Agent, or Firm* — Winston Hsu (57) ABSTRACT

A personal cloud system is disclosed. The personal cloud system includes at least a smart device, and a server comprising at least a virtual machine, wherein each virtual machine includes a target text unit, the target text unit is information-connected to a header having a sorting code, the header is information-connected a logic configurable unit having at least an image file, and each image file includes an identification (ID) corresponding to the sorting code to be precisely read by the header, wherein the at least a smart device is connected to the server via the Internet or a local area network to read the logic configurable unit having an application, and the application is read and displayed according to the corresponding sorting code of the header such that the at least a smart device loads and executes the corresponding image file.

12 Claims, 8 Drawing Sheets

(56) References Cited

U.S. PATENT DOCUMENTS

2015/0105148 A1* 4/2015 Consul .................. G06T 1/20
 463/31
2015/0188609 A1* 7/2015 Inoue ................. H04B 5/0037
 455/41.1
2018/0077244 A1* 3/2018 Thakkar ................ H04L 67/02

* cited by examiner

PERSONAL CLOUD SYSTEM AND RELATED LOCALIZATION METHOD

BACKGROUND OF THE INVENTION

1. Field of the Invention

The present invention relates to a personal cloud system and related localization method, and more particularly, to a personal cloud system and related localization method capable of asynchronously reading the data in a cloud server.

2. Description of the Prior Art

With the advancement and development of technology, many kinds of electronic devices have become indispensable in our daily life. Due to the rapid development in size and amount of conventional software or firmware files, the storage device size of a conventional smart device is insufficient for loading mass applications and software and executing applications with large files. As the storage size of the conventional smart device is limited, it cannot contain too many applications. Further, when too many applications are installed on the conventional smart device, a majority of resources on the smart device are utilized for reading the applications. In addition, when an extra storage device, e.g. an external hard disk or a cloud storage device, is added to the conventional smart device, efficiency might be influenced when the smart device executes applications or software due to the connection interface. Therefore, an improvement to the conventional technique is necessary.

SUMMARY OF THE INVENTION

The present invention provides a personal cloud system and related localization method, which is capable of asynchronously reading the information stored on the cloud server, in order to accelerate the efficiency when the smart device executes the application or software stored on the cloud storage device and solve the problems stated above.

The present invention provides a personal cloud system and related localization method, which is capable of asynchronously reading information stored on a cloud server in order to increase efficiency when the smart device executes applications or software stored on the cloud storage device, to thereby solve the problems stated above.

An embodiment of the present invention discloses a personal cloud system, comprising: at least a smart device; and a server comprising at least a virtual machine, wherein each virtual machine includes a target text unit, and the target text unit is information-connected to a header having a sorting code, and the header is information-connected a logic configurable unit having at least an image file, and each image file includes an identification (ID) corresponding to the sorting code to be precisely read by the header; wherein the at least a smart device is connected to the server via an internet or a local area network to read the logic configurable unit having an application, and the application is read and displayed according to the corresponding sorting code of the header such that the at least a smart device loads and executes the corresponding image file.

Another embodiment of the present invention discloses a localization method for a personal cloud system, wherein the localization method comprises the following steps: (a) activating an application installed on a storage unit of a smart device; (b) connecting a server and searching a target text unit; (c) searching information of an application in a header of the server; and (d) returning to the smart device and displaying an application's menu on the smart device or presenting the application's menu in an audio-visual manner on the smart device.

Another embodiment of the present invention discloses a localization method for a personal cloud system, wherein the localization method comprises the following steps: (a) activating an application installed on a storage unit of a smart device; (b) connecting a server and searching whether a target text unit exists or not; when yes, executing step (c) and when no, executing step (e); (c) searching whether information of an application exists in a header of the server or not; when yes, executing step (d) and when no, executing step (e); (d) reading a setting unit with identical sorting code; and (e) returning to the smart device and displaying an application's menu on the smart device or presenting the application's menu in an audio-visual manner on the smart device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
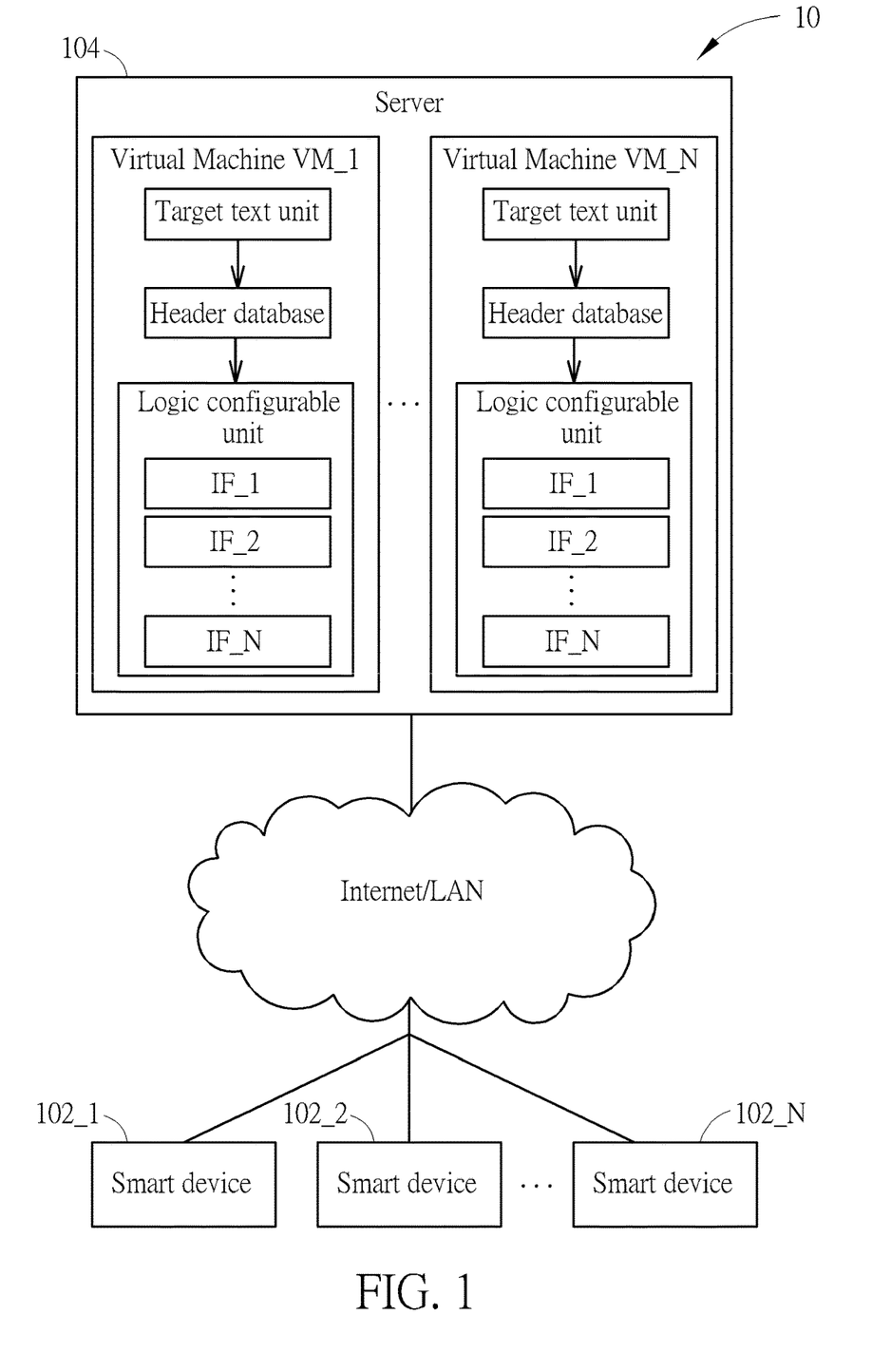
FIG. 1 is a schematic diagram of a personal cloud system according to an embodiment of the present invention.

Refer to FIG. 1, which is a schematic diagram of a personal cloud system 10 according to an embodiment of the present invention. The personal cloud system 10 includes at least a smart device 102 and a server 104. The smart device 102 may be a smart mobile, a pad, a computer, a smart speaker, a smart robot, a game machine or any interactive device. The server 104 includes at least a virtual machine VM, each of the virtual machines VM_1-VMN may be a virtual private server (VPs), an Amazon web services (AWS) or any server technique, wherein each virtual machines VM_1-VMN includes a target text unit, the target text unit is information-connected to a header having a sorting code, and the header is information-connected a logic configurable unit having at least an image file, and each image file includes an identification (ID) corresponding to the sorting code to be precisely read by the header. In an example, the header may be a small database, text file or folder header. In an embodiment, the virtual machine VM may be a single dedicated server having a user menu, and as shown in FIG. 1, the virtual machine VM may include the image files IF_1-IF_N. Notably, the smart device 102 is connected to the server 104 via the Internet or a local area network so as to read the logic configurable unit with an application, which reads and displays according to the sorting code corresponding to the header, such that the smart device 102 loads and executes the corresponding image file IF. For example, the server 104 may be a cloud server connected to the smart device 102 via the internet or the local area network. Therefore, the smart device 102 may read the data of the server 104 asynchronously, such that the smart device 102 may simultaneously synchronize the data of the server 104, e.g. applications, records or keys, when the smart device 102 executes the application.

Figure 2:
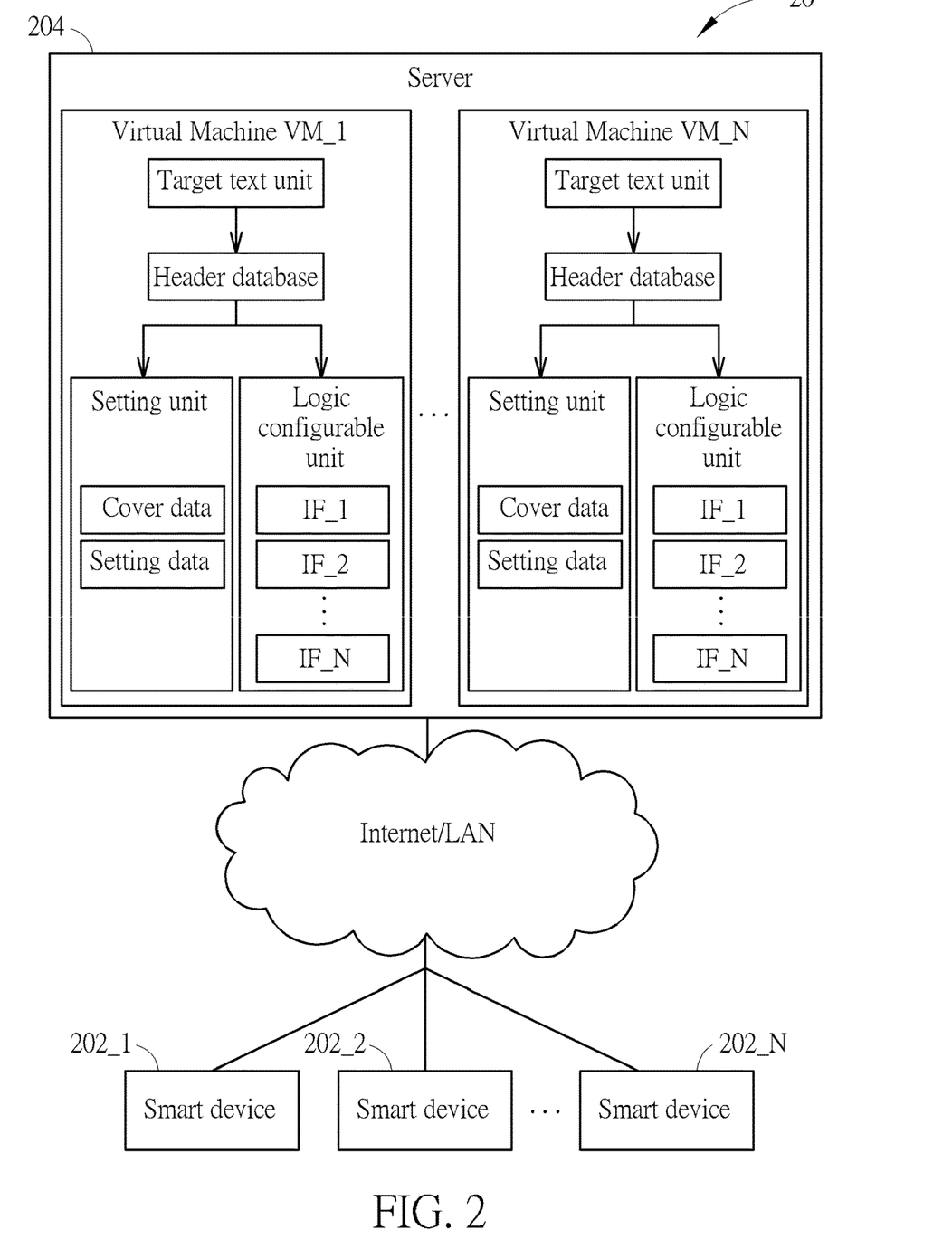
FIG. 2 is a schematic diagram of a personal cloud system according to another embodiment of the present invention.

According to different applications and design concepts, FIG. 2 is a schematic diagram of a personal cloud system 20 according to another embodiment of the present invention. The personal cloud system 20 includes at least a smart device 202 and a server 204. The smart device 202 may be a smart mobile, a pad, a computer, a smart speaker, a smart robot, a game machine or any interactive device. The server 204 includes at least a virtual machine VM, each virtual machines VM_1-VM_N includes a target text unit, which is information-connected to a header having a sorting code, and the header is information-connected a logic configurable unit having at least an image file, and each image file includes an identification (ID) corresponding to the sorting code to be precisely read by the header. Different from the personal cloud system 10, each virtual machine VM of the personal cloud system 20 further includes a setting unit, which is information-connected to the header, wherein the setting unit further includes a cover data or a setting data. The header of the server 204 may read the logic configurable unit having at least an image file IF, and the image file IF has an identification (ID) corresponding to the sorting code to be read by the header, wherein each image file IF includes an identification, a title, a program or a video file. Therefore, the smart device 202 of the personal cloud system 20 may asynchronously read the data on the server 204, such that the smart device 202 may simultaneously synchronize the data in the server 204 when the smart device 202 executes the application. In this way, the smart device 202 of the personal cloud system 20 is free from gigantic hardware or firmware resources to execute all kinds of applications, and is solely connected to the virtual machine VM of the server 204 via the Internet or the local area network so as to execute selected applications.

Notably, those skilled in the art may design the driving device based on different system requirements. For example, the server 104 or 204 may be an XBOX, an XBOX360, a PS2, a PS3, a WII, an N64 or any computer device with a processor. The smart device 102 or 202 may be a mobile phone, mobile pad, a computer device, a smart speaker, a robot, a game machine or any interactive function device. The embodiments stated above may all be modified based on requirements of the user or a manufacturer. These modifications are not limited thereto, and also belong to the scope of the present invention.

Figure 3:
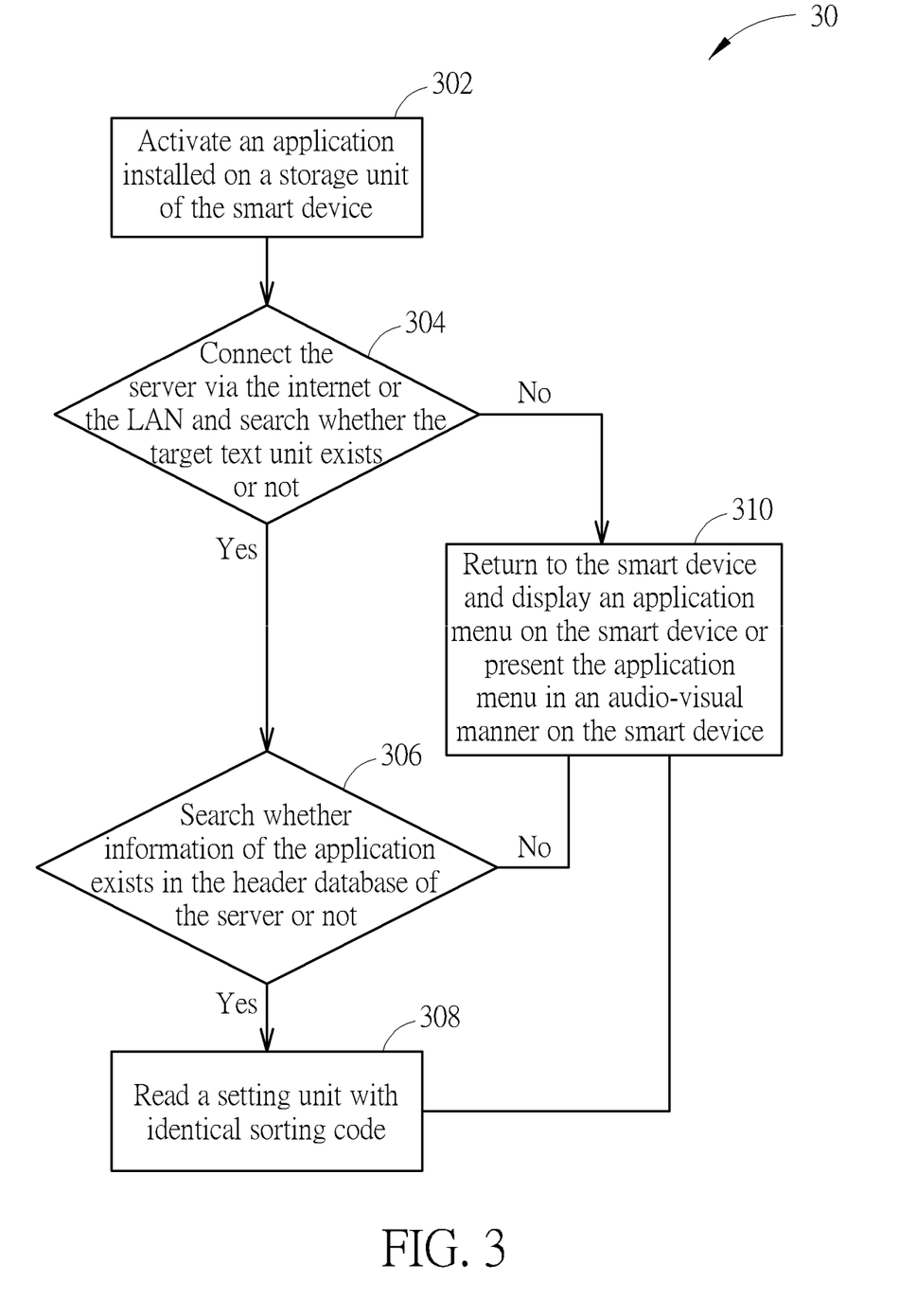
FIG. 3 is a schematic diagram of a localization process according to an embodiment of the present invention.

Furthermore, when the user selects the application on the smart device 102 or 202, operation steps of the personal cloud system 10 or 20 may be concluded to a localization process 30 as shown in FIG. 3. The localization process 30 includes the following steps:

Step 302: activate an application installed on a storage unit of the smart device.

Step 304: connect the server via the internet or the local area network (LAN) and search whether the target text unit exists or not; when yes, execute step 306, and when not, execute step 310.

Step 306: search whether information of the application exists in the header of the server or not; when yes, execute step 308, and when no, execute step 310.

Step 308: read a setting unit with identical sorting code.

Step 310: return to the smart device and display an application's menu on the smart device or present the application's menu in an audio-visual manner on the smart device.

For example, when the smart device 102 or 202 is a projecting device, the application's menu may be presented in a projecting manner. In another example, when the smart device 102 or 202 is a robot, the application's menu may be presented in an audio-visual manner, and is not limited thereto.

Figure 4:
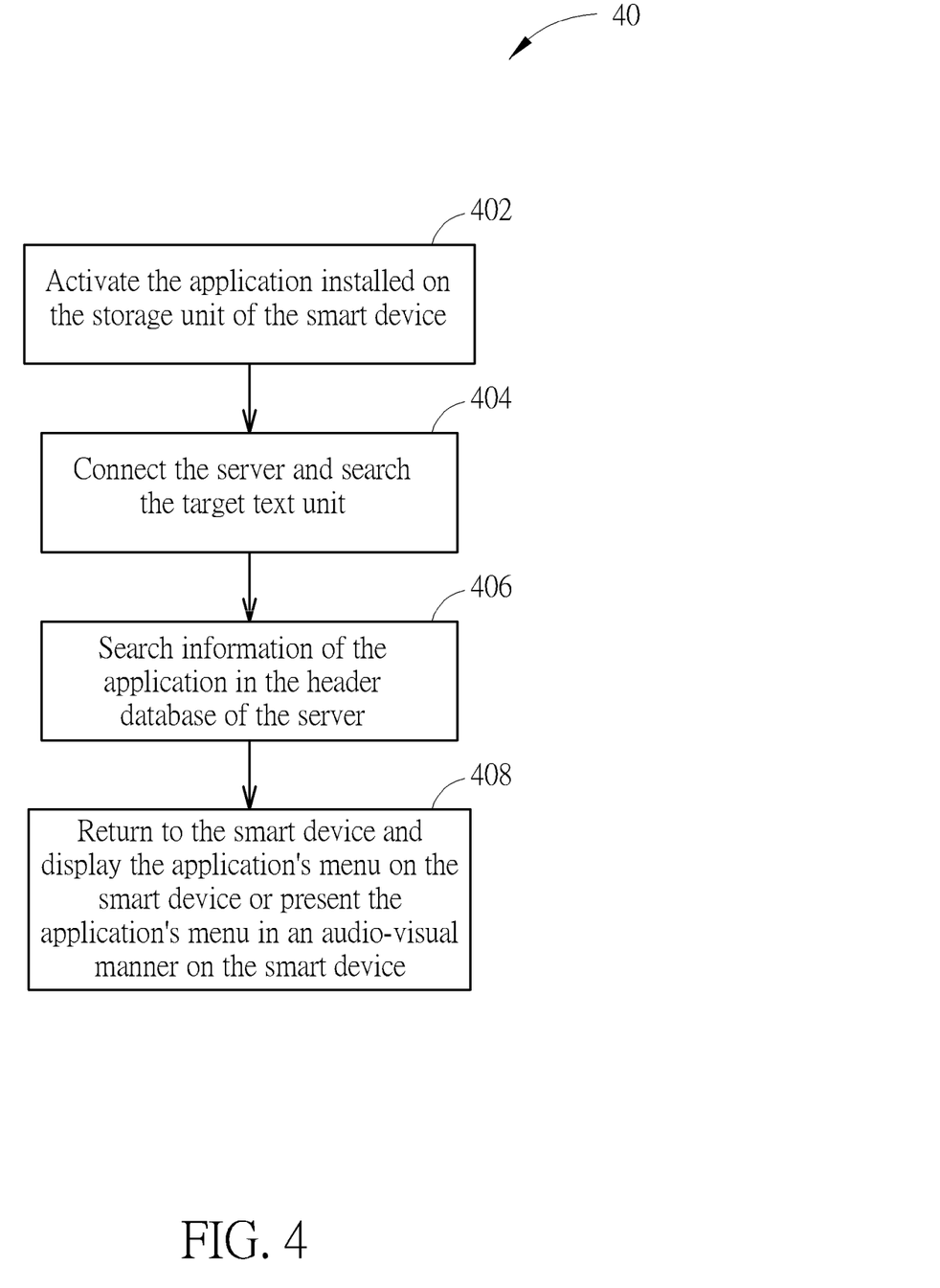
FIGS. 4-6 are schematic diagrams of a process according to an embodiment of the present invention.

In another embodiment, when the user selects the application on the smart device 102 or 202 of the personal cloud system 10 or 20, the operation steps of the personal cloud system 10 or 20 may be concluded to a process 40 as shown in FIG. 4. The process 40 includes the following steps:

Step 402: activate the application installed on the storage unit of the smart device.

Step 404: connect the server and search the target text unit.

Step 406: search information of the application in the header of the server.

Step 408: return to the smart device and display the application's menu on the smart device or present the application's menu in an audio-visual manner on the smart device.

Figure 5:
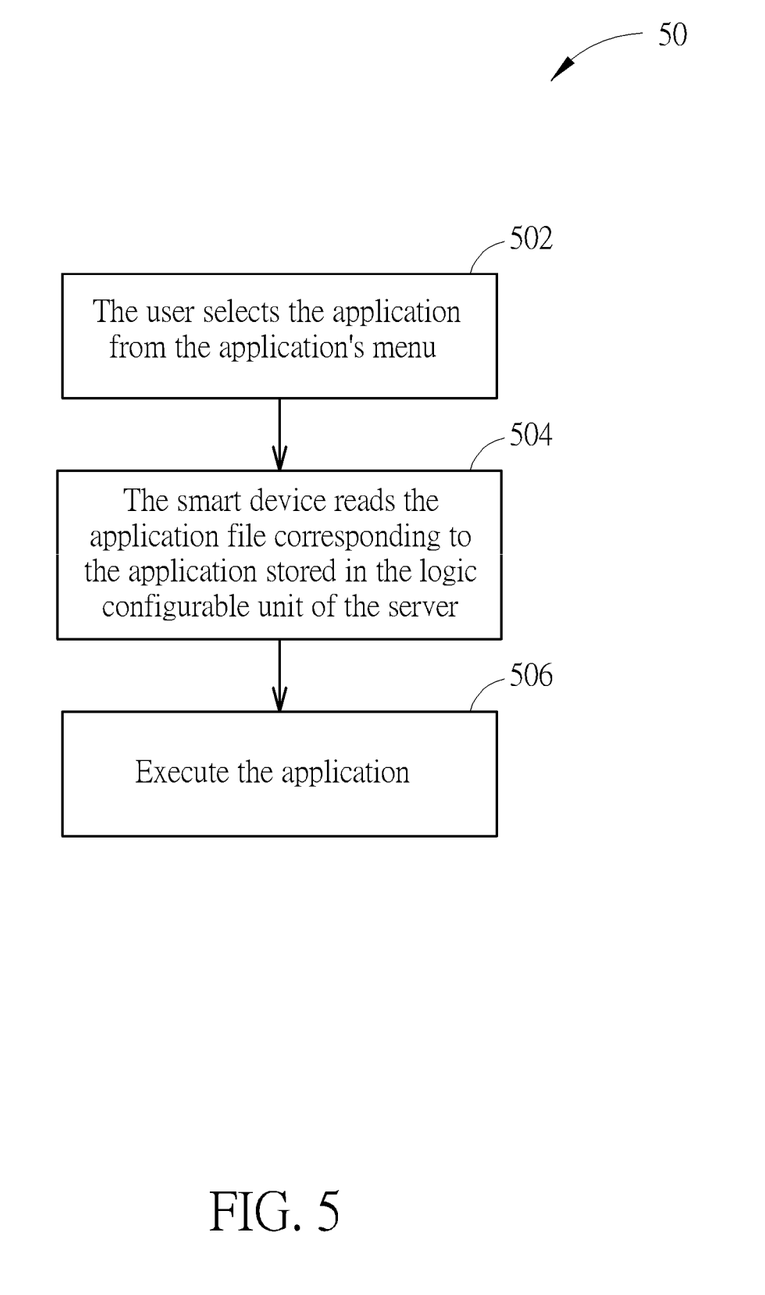

Then, when the personal cloud system 10 or 20 returns the read setting unit corresponding to the application to the smart device, steps of reporting the application's menu to the user to execute the application may be concluded to a process 50. Refer to FIG. 5, which is a schematic diagram of a process 50 according to an embodiment of the present invention. The process 50 includes the following steps:

Step 502: the user selects the application from the application's menu.

Step 504: the smart device reads the application file corresponding to the application stored in the logic configurable unit of the server.

Step 506: execute the application.

Figure 6:
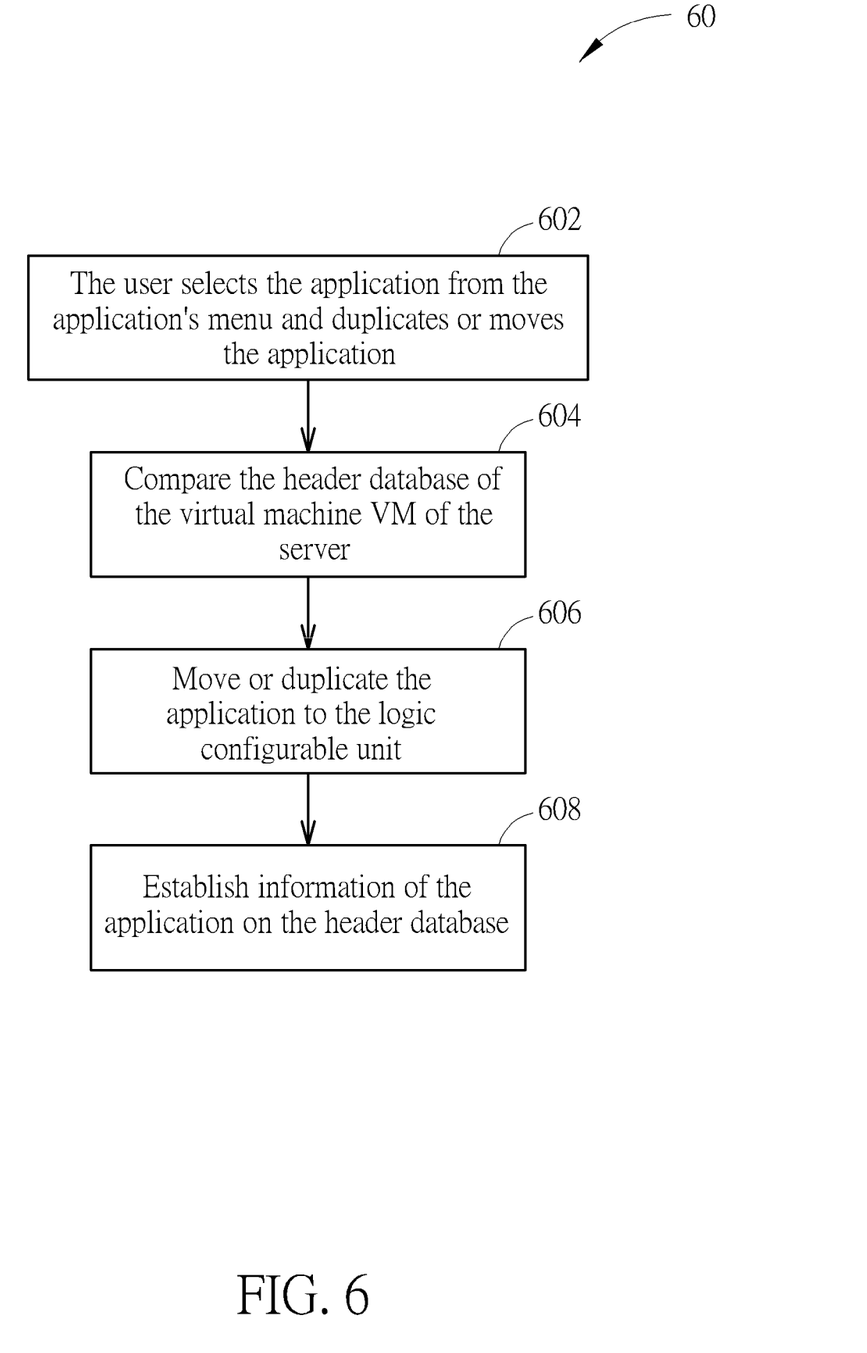

When the user modifies a state of the application, steps of the personal cloud system 10 or 20 modifying the information of the application may be concluded to a process 60. Refer to FIG. 6, which is a schematic diagram of a process 60 according to an embodiment of the present invention. The process 60 includes the following steps:

Step 602: the user selects the application from the application's menu and duplicates or moves the application.

Step 604: compare the header of the virtual machine VM of the server.

Step 606: move or duplicate the application to the logic configurable unit.

Step 608: establish information of the application on the header.

Notably, the process 60 is an embodiment of "return to the smart device and display an application's menu on the smart device or present the application's menu in an audio-visual manner on the smart device" as stated in step 310 and step 408.

Figure 7:
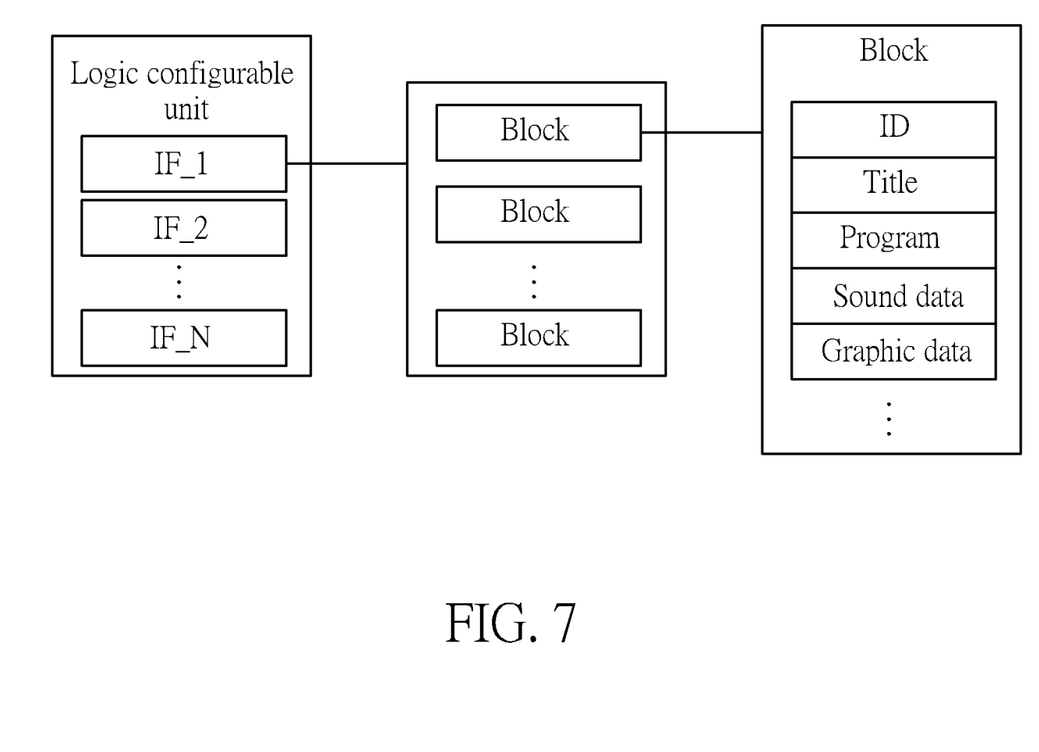
FIGS. 7 and 8 are structural diagrams of a logic configurable unit according to an embodiment of the present invention.
Figure 8:
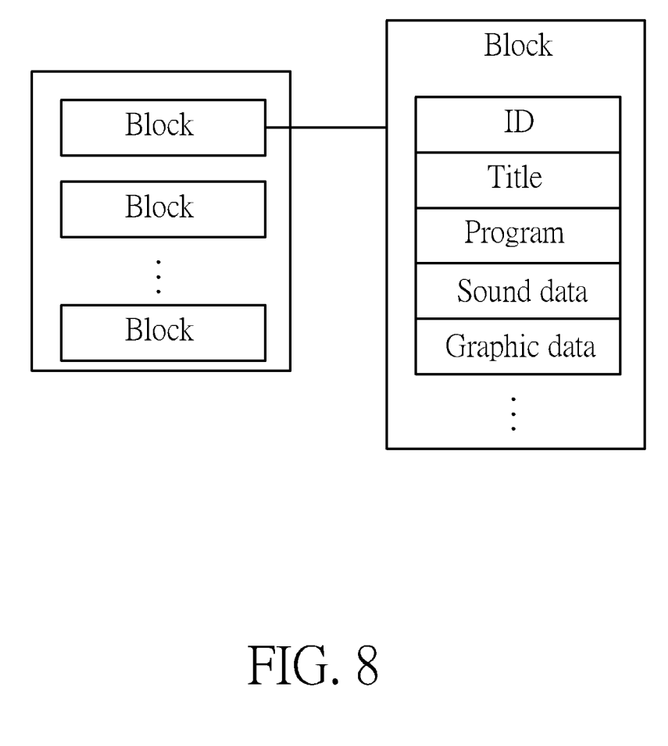

Refer to FIGS. 7 and 8, which are structural diagrams of a logic configurable unit according to an embodiment of the present invention. As shown in FIG. 7, from a perspective of the storage device, the logic configurable unit includes multiple image files IF. Each of the image files may be de-encapsulated as blocks, wherein when any block is selected and de-encapsulated, an ID, a title, a program, a sound data or a graphic data included in each block may be perceived. As shown in FIG. 8, from a perspective of a server end, the logic configurable unit includes multiple blocks, which further include the ID, title, program, sound data or graphic data. Notably, each block in FIGS. 7 and 8 may be a compression file or any kind of archive file, but is not limited thereto.

In summary, the present invention provides a personal cloud system and related localization method, which is capable of asynchronously reading information stored on a cloud server in order to accelerate the efficiency when the smart device executes applications or software stored on the cloud storage device, thereby solving issues of insufficient resources of the smart device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A personal cloud system, comprising:
   at least a smart device; and
   a server comprising at least a virtual machine, wherein each virtual machine includes a target text unit, the target text unit is information-connected to a header having a sorting code, the header is information-connected to a logic configurable unit having at least an image file, and each image file includes an identification (ID) corresponding to the sorting code to be precisely read by the header;
   wherein the at least a smart device is connected to the server via the Internet or a local area network to asynchronously read the logic configurable unit having an application, and the application is read and displayed according to the corresponding sorting code of the header such that the at least a smart device loads and executes the corresponding image file;
   wherein the corresponding image file is loaded and executed by the smart device asynchronously.

2. The personal cloud system of claim 1, wherein the header of each virtual machine is information-connected to a setting unit, and the setting unit includes a cover data or a setting data.

3. The personal cloud system of claim 2, wherein each image file includes an ID, a title, a program or a video file, wherein each image file is a data file, a compression file or any kind of archive file.

4. The personal cloud system of claim 2, wherein the server is an XBOX, an XBOX360, a PS2, a PS3, a WII, an N64 or any kind of computer device with a processor.

5. The personal cloud system of claim 2, wherein the smart device is a mobile phone, a mobile pad, a computer device, a smart speaker, a robot, a game machine or any electronic device with interactive function.

6. The personal cloud system of claim 2, wherein the virtual machine is a single dedicated server, a virtual private server (VPS), an Amazon web services (AWS) or any server technique.

7. The personal cloud system of claim 2, wherein the smart device generating an application's menu includes the following steps:
   (a) activating the application installed on a storage unit of the smart device;
   (b) connecting the server via the Internet or the local area network and searching a corresponding first target text unit;
   (c) searching information in a corresponding first header; and
   (d) returning to the smart device and displaying the application's menu on the smart device or presenting the application's menu in an audio-visual manner on the smart device.

8. The personal cloud system of claim 7, wherein the smart device executing the image file includes the following steps:
   (a) selecting a first application from the application's menu;
   (b) reading, by the smart device, a first application file of the first application corresponding to a first logic configurable unit stored in the server; and
   (c) executing the first application.

9. The personal cloud system of claim 7, wherein the smart device establishing content of the application's menu includes the following steps:
   (a) selecting a second application from the application's menu and duplicating or moving the second application;
   (b) comparing the header of the virtual machine of the server;
   (c) moving or duplicating the second application to a second logic configurable unit; and
   (d) establishing information of the second application on the header.

10. A localization method for a personal cloud system, wherein the localization method comprises the following steps:
    (a) activating an application installed on a storage unit of a smart device;
    (b) connecting a server and searching a target text unit;
    (c) searching information of an application in a header of the server; and
    (d) returning to the smart device and displaying an application's menu on the smart device or presenting the application's menu in an audio-visual manner on the smart device;
    (e) selecting a first application from the application's menu;
    (f) asynchronously reading, by the smart device, a first application file of the first application corresponding to a first logic configurable unit having at least an image file stored in the server; and
    (g) executing the first application;
    wherein the corresponding image file is loaded and executed by the smart device asynchronously.

11. A localization method for a personal cloud system, wherein the localization method comprises the following steps:
    (a) activating an application installed on a storage unit of a smart device;
    (b) connecting a server and searching whether a target text unit exists or not, when yes, executing step (c), and when no, executing step (e);
    (c) searching whether information of an application exists in a header of the server or not, when yes, executing step (d), and when no, executing step (e);
    (d) reading a setting unit with identical sorting code; and
    (e) returning to the smart device and displaying an application's menu on the smart device or presenting the application's menu in an audio-visual manner on the smart device;
    (f) selecting a first application from the application's menu;
    (g) asynchronously reading, by the smart device, a first application file of the first application corresponding to a first logic configurable unit having at least an image file stored in the server; and (h) executing the first application;

wherein at least an image file of the application is loaded and executed by the smart device asynchronously.

12. The localization method of claim 11, wherein the setting unit includes a cover data or a setting data.

\* \* \* \* \*